United States Patent [19]

Chan

[11] 4,330,190
[45] May 18, 1982

[54] POCKET CAMERA

[75] Inventor: Kwok Yan Chan, North Point, Hong Kong

[73] Assignee: W. Haking Enterprises Limited, North Point, Hong Kong

[21] Appl. No.: 210,236

[22] Filed: Nov. 25, 1980

[51] Int. Cl.³ ............................................. G03B 17/26
[52] U.S. Cl. ..................................... 354/275; 354/288
[58] Field of Search ................................ 354/275, 288

[56] References Cited
U.S. PATENT DOCUMENTS 3,543,664  12/1970  Kremp et al. ..................... 354/288
3,672,279   6/1972  Hackenberg et al. ............. 354/288

Primary Examiner—Russell E. Adams
Attorney, Agent, or Firm—Wallenstein, Wagner, Hattis, Strampel & Aubel

[57] ABSTRACT

A camera including a housing having a film compartment adapted to receive a film cartridge with a closure adapted to hold the film cartridge within the film compartment. The closure has a resilient finger movable therewith which is adapted to engage a projection on the surface of the film cartridge during movement of the closure to a closed position so that subsequent movement to an open position will initiate movement of the film cartridge out of the film compartment.

4 Claims, 4 Drawing Figures

POCKET CAMERA

DESCRIPTION

1. Technical Field

The present invention relates generally to cameras and, more specifically, to a conventional pocket camera that is adapted to receive elongated film cartridges that have a supply end and a take-up end with a drive mechanism supported on the housing of the camera and adapted to engage a driven gear on the take-up end of the film cartridge.

2. Background Prior Art

Compact pocket cameras have become a common item in most households and generally consist of a housing that has an elongated film compartment adjacent one edge thereof which is adapted to be closed by a cover that is pivoted or slideable on the housing. One of the most common types of pocket camera that is in existence today is one which is adapted to use a conventional 110-film cartridge that is elongated in nature and has a generally circular supply end and a generally circular take-up end with an intermediate portion adapted to be aligned with the lens in the camera. Usually, such camera has a manually or motor driven gear supported within the housing with its periphery in communication with the film compartment, while the cartridge has a gear rotatable on the take-up end of the cartridge and engageable with the drive gear to transport the film from the supply end to the take-up end. The conventional film cartridge of this type has some type of restriction means which prevents any further movement of the film from the supply end to the take-up end after the last segment of the film has been exposed.

More recent compact cameras of this type incorporate an electric motor which automatically transports the film from the supply end to the take-up end upon actuation of the shutter release button to automatically condition the camera for a subsequent exposure.

One of the problems that has been encountered in this type of camera is that any actuation of the shutter after the last portion of the film has been exposed will result in rotation of the drive gear with respect to the driven gear on the film cartridge, which is now in a stationary condition because of the restriction within the cartridge. As a result, the metal drive gear will have the tendency to dig into the plastic film cartridge gear, which may result in jamming of the gears. When such jamming or interlocking occurs, it is extremely difficult to remove the film cartridge from the film compartment because only a flat, generally unobstructed surface is exposed when the cover is open.

SUMMARY OF THE INVENTION

According to the present invention, a unique additional structure is provided in the camera which is capable of automatically separating the jammed gears between the camera housing and the film cartridge when the cover is moved from the closed to the open position.

More specifically, the present invention is directed to a camera having a housing which defines a film compartment that is open towards one side of the housing and has a closure movable between open and closed positions for maintaining a film cartridge within the housing. The closure or cover has an elongated finger extending from an inner surface thereof which is adapted to engage a projection on the peripheral surface of the film cartridge when the cover is moved to the closed position with a film cartridge in the film compartment. In the closed position, the finger grips the projection on the peripheral surface of the film cartridge and will aid in initiating movement of the film cartridge out of the film compartment when the closure or cover is moved from the closed position toward the open position.

The finger or latch means is specifically designed for use in a camera having a drive gear in communication with the film compartment with the film cartridge having a driven gear that is in mesh with the drive gear when the film cartridge is within the housing and the cover is closed. The particular film cartridge that has been illustrated is an elongated cartridge that has a supply end and a take-up end with an intermediate portion adapted to be aligned with the lens of the camera for exposure of the film upon actuation of a shutter mechanism. The shutter mechanism is preferably connected to a motor which is automatically actuated upon actuation of the shutter so that the exposed portion of the film is moved to the take-up end and a new portion of the film is aligned with the lens.

BRIEF DESCRIPTION OF SEVERAL VIEWS OF DRAWINGS

DETAILED DESCRIPTION

Figure 1:
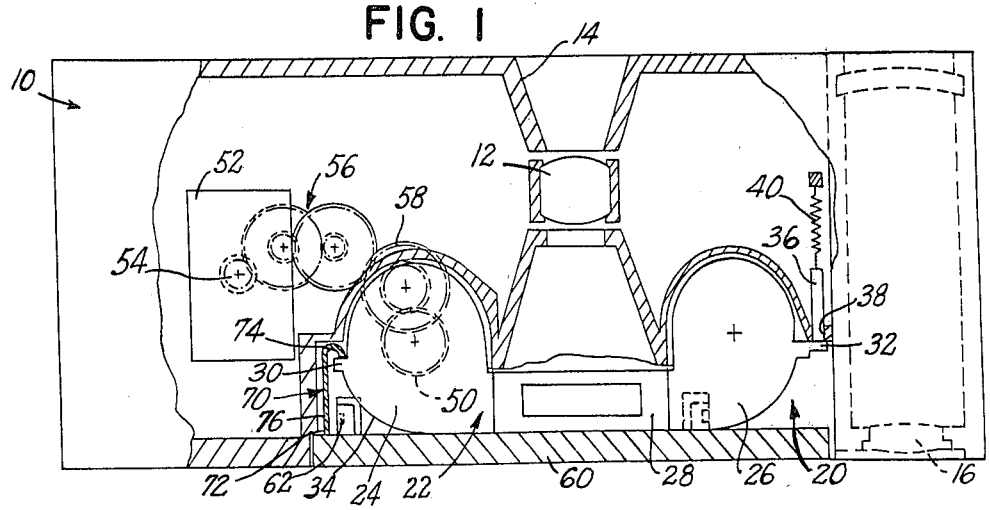
FIG. 1 is a top plan view of a pocket camera with certain parts thereof broken away for purposes of clarity.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings discloses a camera consisting of a housing generally designated by the reference numeral 10. The housing incorporates a conventional lens 12 located in an opening 14 in housing 10. A viewfinder 16 is located adjacent one end of the housing. The housing 10 has a generally elongated film compartment 20 that opens towards one edge of the housing and receives a film cartridge which has a take-up end 24 and a supply end 26 and an intermediate elongated portion 28 adapted to be aligned with lens 12. Film cartridge 22 normally has elongated projections or ribs 30, 32 extending respectively from peripheral surface 34 adjacent the supply end 26 and the take-up end 24. In the film cartridge illustrated in FIG. 1, the projection or rib 32 on the supply end of the film cartridge engages a member 36 that is slideable in an opening 38 and is biased by spring 40 to bias the film cartridge to a fixed position, as will be described later.

The conventional film cartridge also has a driven gear 50 that is connected to a driven shaft supported within the take-up end 24 of the film cartridge. Driven gear 50 is driven by a motor 52 that has its output shaft 54 connected through a gear reduction unit 56 to a drive gear 58. The gears 50 and 58 are normally maintained in mesh with each other by cover 60 which is pivotally supported on pivot pins 62 along the edge thereof, and the inner surface of cover 60 engages the adjacent surface of film cartridge 22. Normally, the cover or closure 60 has leaf springs (not shown) connected to the inner surface thereof which engage the peripheral surface 34 of film cartridge 22 to bias gear 50 into mesh with gear 58, and at the same time will move member 36 against the bias of spring 40 associated therewith.

As indicated above, when utilizing a camera of this type having an automatic drive motor 52 which is actuated in response to operation of the shutter, there is a possibility of inadvertently actuating the shutter after the last portion of the film has been exposed and the trailing end of the film is restrained from further movement. When such event occurs, the driving force of the motor on the metallic gear 58 will cause the teeth of the drive gear 58 to dig into the plastic teeth of the driven gear 50 and, in some instances, interlock with each other. In the event that such interlocking or jamming occurs, it is extremely difficult, if not impossible, to remove the film cartridge from the film compartment.

Figure 2:
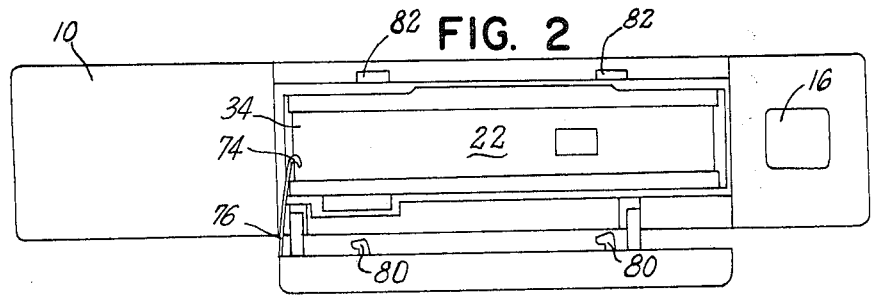
FIG. 2 is a side elevational view of the camera shown in FIG. 1 with the cover in an open position.

According to the present invention, the above problem has been solved by addition of a single component that is preferably formed as part of the cover or closure 60 and acts to separate the interlocked gears when the cover is opened. More specifically, as illustrated in FIG. 1, cover or closure 60 has a finger or latch means 70 formed as a part thereof and which has a base end 72 attached to the inner surface of the cover 60 and an outer free end portion 74. Base end portion 72 is preferably integral with the inner surface of cover 60, and finger 70 has an intermediate resilient portion 76. In its unrestrained condition, latch member or finger 70 is biased to the position illustrated in FIG.2 and free end portion 74 is in the form of a hook-shaped member which is biased into alignment with peripheral surface 34 of the film cartridge. Thus, after the film cartridge 22 has been inserted into the film compartment 20, the cover or closure 60 can be moved from the position illustrated in solid lines in FIGS. 2 and 4 towards the closed position illustrated in FIG. 3. When the cover reaches substantially the intermediate position illustrated in phantom lines in FIG. 4, the free end surface of hook-shaped portion 74 of latch member or finger 70 engages the peripheral surface 34 of the film cartridge and further movement of the closure or cover 60 towards the closed position will cause the free end portion 74 of the finger 70 to slide along the surface 34 of film cartridge 22 and move the free end portion away from its first position. During such movement, the inherent resiliency of the elastic finger 70 will develop a built-in force which will tent to return the free end portion to its first position when the external force is removed. Such biasing force is utilized to produce the automatic latching of finger 70 with respect to the elongated rib or projection 30 on the take-up end 24 of the film cartridge 22. Thus, when the cover reaches its fully closed position, illustrated in FIGS. 1 and 3, the free end or hook-shaped portion 74 of finger 70 is latched or interlocked with the rear abutment surface of the projection 30. In this locked position, further pivoted latch elements 80 are received into the recesses 82 to securely lock the cover in the closed position. As indicated above, in this closed position, spring fingers attached to the inner surface of the cover will engage the adjacent surface of the film cartridge 22 and hold the film cartridge in a tensioned condition between the spring-biased fingers (not shown) on cover 60 and spring-biased member 36.

Figure 3:
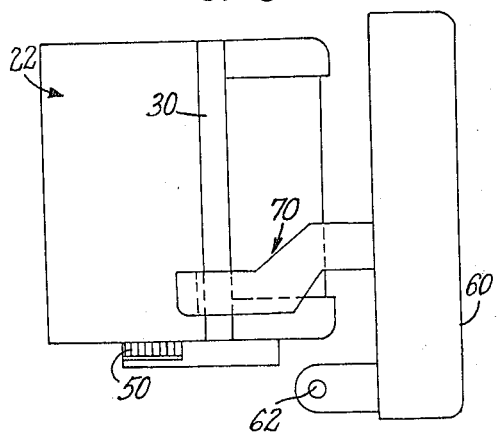
FIG. 3 is an end view of the pocket camera, with the housing deleted for purposes of clarity, schematically showing the cover in a closed position; and, FIG. 4 is a view similar to FIG. 3 showing the cover in a fully open position and a partially closed position.
Figure 4:
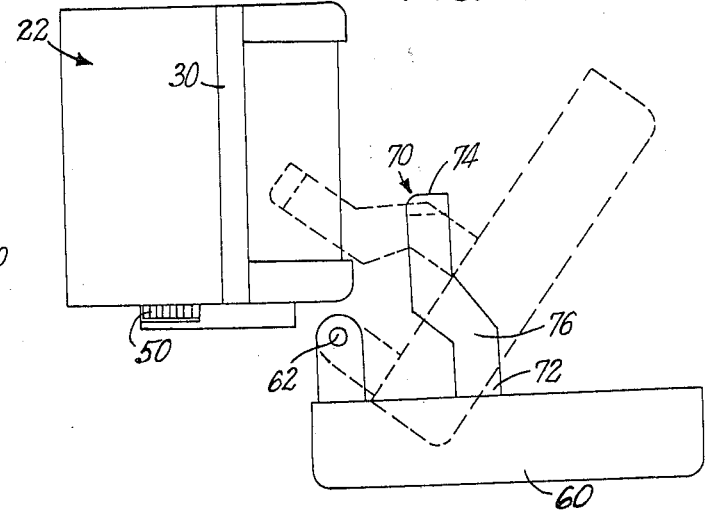

With this arrangement, when the cover is moved from the closed condition shown in FIG. 3 to the open position shown in FIG. 4, the hook-shaped portion or free end portion 74 of elongated resilient finger 70 will pull on the abutment surface defined on projection 30 to automatically initiate movement of the film cartridge out of the film compartment as the closure or cover is moved from the closed position to the open position. This will automatically dislodge the interlocking or jammed gears in the event such jamming has occured prior to opening of the cover for removal of the film cartridge after all of the film has been exposed.

While not limited to any specific materials, the cover and the latching member are preferably formed from a plastic material which has an inherent tendency to define an unrestrained first position for the elongated finger whose movement from this position will produce an internal force within the resilient member which will tend to return the elongated finger to its position when external forces have been removed therefrom. The abutment on the periphery of the film cartridge could also be defined by a recess in surface 34 rather than the rib 30 described above.

While the specific invention has been described in connection with a motor-driven film cartridge camera, it is apparent that the invention has applicability in other environments, such as in a camera without motor drive, where, because of the particular design of the camera, a manual winding operation can cause jamming of the drive and cartridge driven gears or when it is desired to positively releasably lock the cartridge in the camera housing by means other than the force of a closed cover.

I claim:

1. In a camera having a housing with a film compartment adapted to receive through an opening in the housing a roll of film housed in a cartridge with the cartridge having an abutment on a peripheral surface thereof, said abutment configured as an outwardly directed rib, said cartridge under certain conditions being restrained from easy removal from said compartment, and a closure for closing said opening and movable between open and closed positions, the improvement comprising latch means on said closure and movable therewith, said latch means including a finger having a base portion attached to said closure and a hook-shaped free end portion engageable with said rib when said closure is in said closed position and a resilient portion intermediate said base portion and said free end portion normally biasing said free end portion to a first rib-engaging position and accommodating movement thereof from said first position by a camming action by said rib when said closure is moved from said open position towards said closed position, said free end portion interlocking with said rib when a cartridge is in said compartment and said closure is moved to said closed position, said latch means moving said cartridge towards said opening to release the cartridge from the restrained condition as said closure is moved from said closed position toward said open position.

2. The camera of claim 1, wherein said film compartment is adapted to receive a film cartridge having a supply end, a take-up end, a drive gear on said take-up end, and having said rib disposed on said take-up end, and wherein said housing has a drive gear in communication with said film compartment adapted to mesh with said gear on said take-up end, said latch means being disposed to engage said rib on said take-up end and aid in separating said gears when said closure is moved from said closed position toward said open position.

3. A camera as defined in claim 1 or 2 in which said closure is pivoted on said housing and said latch means moves with said closure into engagement with said peripheral surface to move from said first position as said closure moves from said open position toward said closed position.

4. A camera as defined in claim 1 having a drive gear in communication with said compartment with said cartridge having a driven gear adapted to mesh with said drive gear and in which said latch means aids in separating said gears.

* * * * *